(12) United States Patent
Muron et al.

(10) Patent No.: US 6,337,949 B1
(45) Date of Patent: Jan. 8, 2002

(54) SYSTEM FOR CONTROLLING AN ELECTRIC MOTOR OF A FAN ASSOCIATED WITH HEAT EXCHANGERS IN A MOTOR VEHICLE

(75) Inventors: Lionel Muron, Asti; Kamal Mourad, Turin, both of (IT)

(73) Assignee: Gate S.p.A., Turin (IT)

( * ) Notice: Subject to any disclaimer, the term of this patent is extended or adjusted under 35 U.S.C. 154(b) by 0 days.

(21) Appl. No.: 09/788,501

(22) Filed: Feb. 21, 2001

(51) Int. Cl.$^7$ ................................................. H02P 5/00
(52) U.S. Cl. ....................... 388/800; 388/929; 388/934; 123/41.12; 62/133; 236/35
(58) Field of Search .................................. 318/139, 806; 388/800, 804, 929, 934; 123/41.12, 41.05; 62/133, 181, 184, 323.3; 236/35

(56) References Cited

U.S. PATENT DOCUMENTS

| | | | | |
|---|---|---|---|---|
| 4,590,772 A | * | 5/1986 | Nose et al. | 123/41.12 |
| 4,831,313 A | * | 5/1989 | Beilfuss | 388/934 |
| 5,307,644 A | * | 5/1994 | Cummins et al. | 62/133 |
| 5,623,835 A | * | 4/1997 | Layman et al. | 62/133 |

* cited by examiner

Primary Examiner—Khanh Dang
(74) Attorney, Agent, or Firm—Sughrue Mion, PLLC

(57) ABSTRACT

The system comprises a pressure sensor for providing a signal indicative of the pressure of the refrigerant fluid of the air-conditioning system at the output or delivery of the compressor of the system, a sensor for detecting the temperature of the liquid flowing through the engine-cooling system (R), an activation sensor for providing a signal when the air-conditioning system is activated, a sensor for detecting the speed of forward movement of the motor vehicle, and a control and operating unit connected to the sensors and to the electric motor and arranged for:

- determining a first speed for the electric motor in accordance with a function of the pressure of the refrigerant fluid of the air-conditioning system and of the speed of the vehicle,
- determining a second speed for the electric motor in accordance with a function of the temperature of the engine-coolant liquid and of the speed of forward movement of the vehicle, and
- sending to the electric motor control signals to bring its speed of rotation to a value equal to the greater of the first and second speeds.

7 Claims, 2 Drawing Sheets

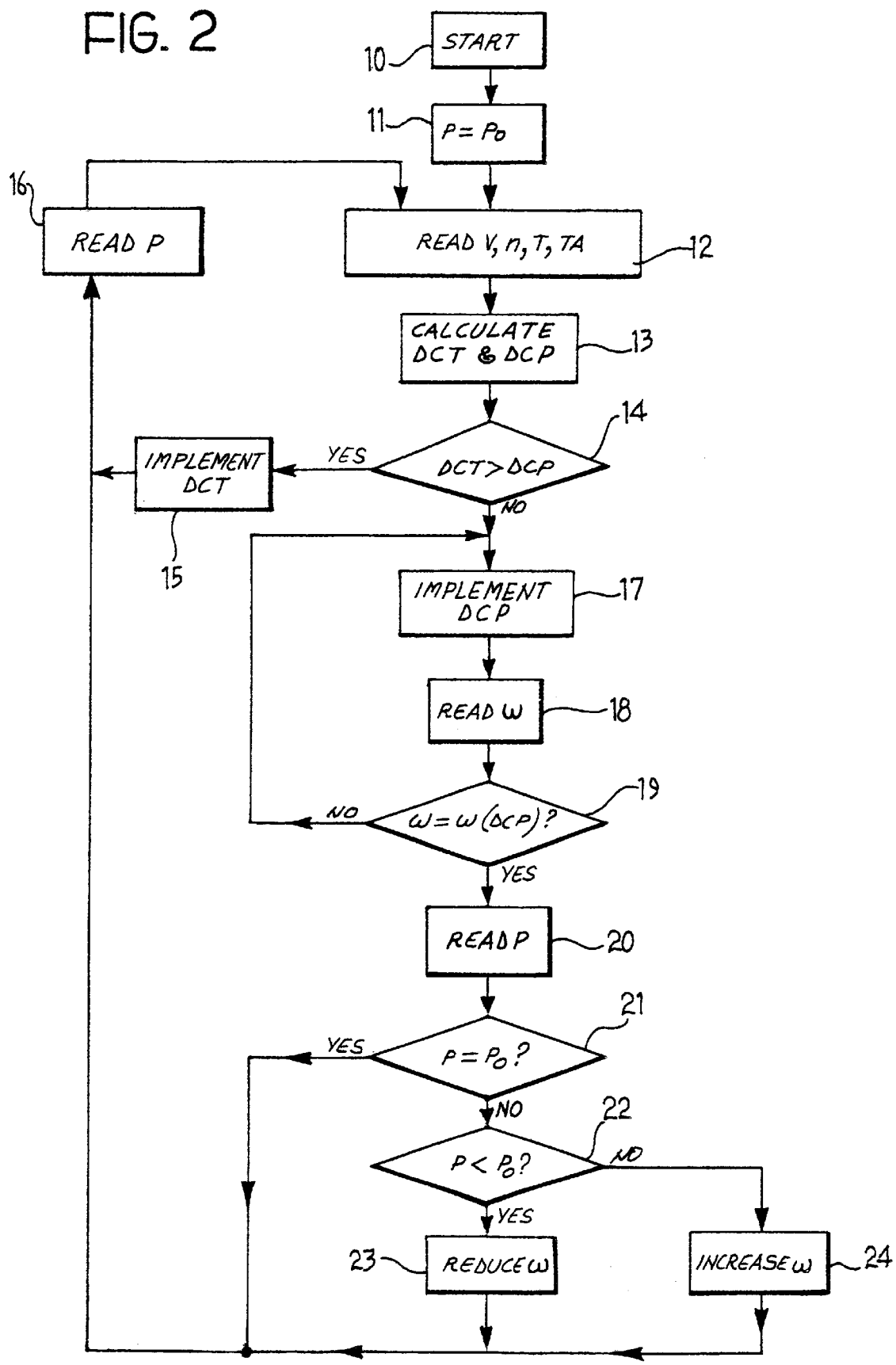

SYSTEM FOR CONTROLLING AN ELECTRIC MOTOR OF A FAN ASSOCIATED WITH HEAT EXCHANGERS IN A MOTOR VEHICLE

The present invention relates to a system for controlling a direct-current electric motor of a fan which is associated, in a motor vehicle, both with a radiator of a hydraulic engine-cooling system and with a condenser of an air-conditioning system for the passenger compartment of a motor vehicle.

Control systems of this type, in which the speed of rotation of the electric motor used can adopt one or more different but constant values, are known. The control of the speed of rotation of the fan motor in these systems has many disadvantages. This is due to the fact that the working conditions of the internal combustion engine of the motor vehicle are greatly variable, as are the ambient temperature conditions. If the fan motor is driven on the basis of the requirements of the engine cooling system, there is therefore a great risk that the air-conditioning system will operate in conditions which are not at all ideal and, in particular, with refrigerant-fluid pressures which are far from ideal.

A known solution which prevents these problems consists in the use of a two-speed motor with a resistor or of a second fan which is driven by an electric motor or is rotated by the engine of the motor vehicle, and which is intended to generate an air-flow in dependence on the requirements of the air-conditioning system with the objective of limiting the total electrical power necessary, particularly in intermediate operating conditions. This solution leads to problems from the point of view of costs and of the structural complexity and control of the system.

The object of the present invention is to provide a control system which can comply effectively with the ventilation requirements of the engine cooling system and of the air-conditioning or climate-control system for the passenger compartment, without requiring the use of an additional fan or of a motor with a resistor for changing the speed.

This and other objects are achieved, according to the invention, by a control system the main characteristics of which are defined in appended claim 1.

Further characteristics and advantages of the invention will become clear from the following detailed description, given purely by way of non-limiting example, with reference to the appended drawings, in which:

FIG. 2 is a flow chart illustrating the way in which such a system operates.

Figure 1:
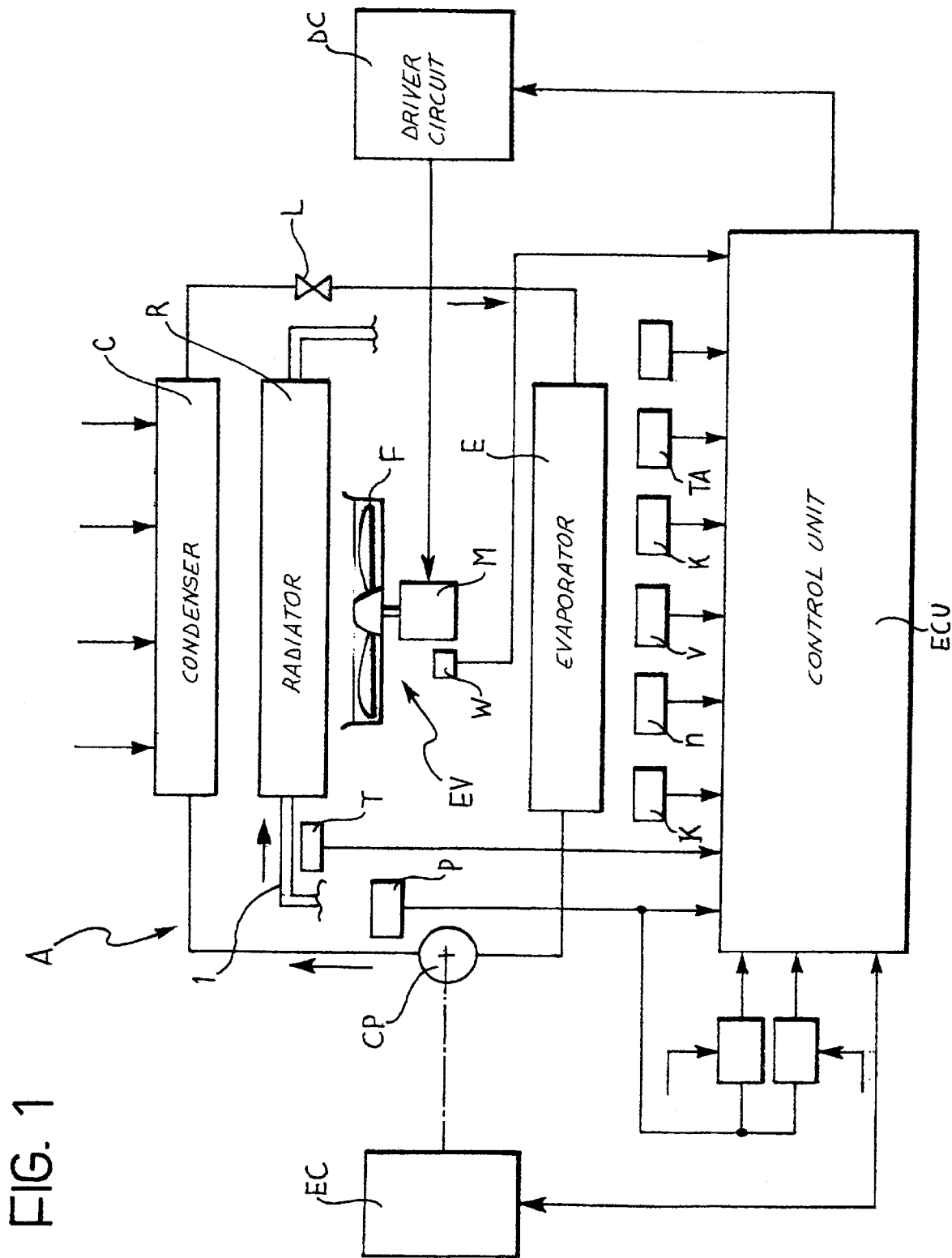
FIG. 1 is a block diagram of a control system according to the invention.

In FIG. 1, the radiator of a hydraulic cooling system for an internal combustion engine (not shown) of a motor vehicle is indicated R. The radiator has an inlet pipe 1 and an outlet pipe 2 for the coolant liquid. An electric temperature sensor T is associated with the inlet pipe 1.

Facing the radiator R is the condenser C of an air-conditioning system, generally indicated A.

The condenser C is connected in a refrigeration circuit of known type comprising a rotary compressor CP which can be rotated by the engine of the motor vehicle, for example, by means of an electrically-operated clutch EC. In the refrigeration circuit, downstream of the condenser C, there is an expansion valve L, followed by an evaporator E the output of which is connected to the input of the compressor CP.

An electric fan, generally indicated EV, is associated with the set of heat exchangers comprising the condenser C and the radiator R and comprises a rotor or fan-wheel F which can be rotated by means of an electric motor M. This motor is, in particular, a direct-current motor.

At the output or delivery of the compressor CP there is an analogue pressure sensor P for providing a signal indicative of the pressure of the refrigerant fluid flowing in the circuit of the air-conditioning system.

The temperature sensor T and the pressure sensor P are connected to corresponding inputs of an electronic control unit ECU. Further sensors and, in particular, the following, are connected to other inputs of the unit:

- a sensor (switch) IC for detecting the activation of the air-conditioning system,
- an (optional) sensor n for detecting the speed of rotation (number of revolutions per unit of time) of the engine shaft of the motor vehicle,
- a sensor V for detecting the speed of forward movement of the motor vehicle,
- a sensor K for detecting the application of a supply voltage to the electrical system of the motor vehicle,
- a sensor ω for detecting the speed of rotation of the motor M,
- a temperature sensor TA for providing electrical signals indicative of the ambient temperature outside the motor vehicle, and
- an (optional) temperature sensor TC for providing electrical signals indicative of the temperature in the passenger compartment of the motor vehicle.

The control unit ECU is also connected to the clutch EC associated with the compressor CP.

The control unit ECU is also connected to a driver circuit DC for causing the electric motor M of the electric fan EV to rotate at a speed variable continuously in dependence on a driving signal applied to its input.

The speed of rotation of the motor M is controlled, in particular, by means of a square-wave driving signal having a variable duty-cycle.

The control unit ECU is arranged to acquire the signals supplied to it by the various sensors and to determine the speed of rotation to be imparted to the electric motor M of the electric fan EV, in the manner which will be described further below. The speed of rotation to be imparted to the electric motor M is determined, for example, by determination of the corresponding value of the duty-cycle of the driving signal to be applied to the driver circuit DC.

As will become clearer from the following, the control unit ECU is arranged, in general, to determine a first speed of rotation for the electric motor M, each time, on the basis of a predetermined function of the pressure P of the refrigerant fluid of the air-conditioning system, of the ambient temperature, and of the speed of forward movement V, monitored by the corresponding sensors.

The control unit ECU is also arranged to calculate a second speed of rotation to be imparted to the electric motor M, on the basis of a predetermined function of the detected temperature T of the engine-coolant liquid, of the ambient temperature, of the speed of forward movement V of the motor vehicle, and of the speed of rotation n of the engine of the motor vehicle, monitored by the corresponding sensors.

In the embodiment described, in which the speed of rotation to be imparted to the electric motor M of the electric fan is set by means of the duty-cycle of the driving signal applied to the driver circuit DC, the above-mentioned first and second speeds are in fact defined by the unit ECU by calculation of the corresponding values of the duty-cycle. In particular, the duty-cycle value corresponding to the first speed will be indicated DCP below, and the duty-cycle value corresponding to the second speed will be defined as DCT.

In normal operating conditions, the unit ECU determines the duty-cycle values DCP and DCT on the basis of the instantaneous values of the pressure P of the refrigerant fluid of the air-conditioning system, of the temperature T of the engine-coolant fluid, of the speed of forward movement V of the vehicle, of the ambient temperature TA, and of the rate of revolution n of the engine of the motor vehicle. The unit then applies to the driver circuit DC a driving signal the duty-cycle of which corresponds to the greater of DCP and DCT.

In initial operating conditions, that is, as soon as the air-conditioning system A is activated, the control unit ECU does not determine the initial value of DCP on the basis of the instantaneous pressure of the refrigerant fluid in the air-conditioning system, but on the basis of a predetermined reference value for this pressure, indicated $P_0$ below, naturally, as well as on the basis of the speed of forward movement of the motor vehicle actually detected. The reference value $P_0$ of the pressure of the refrigerant fluid is determined, for example, as the optimal value at which the refrigeration circuit of the air-conditioning system has the maximum performance in the worst ambient conditions, for example, when the ambient temperature outside the motor-vehicle is 50° C. and the humidity of the external air is 90%. A typical value of the pressure $P_0$ is, for example, 17 atmospheres.

The reference value $P_0$ may be a constant value or may be a value variable for example, between 15 and 25 atmospheres in accordance with a predetermined increasing function of the ambient temperature, as the latter varies.

In the initial conditions described above, the unit calculates the duty-cycle values DCP (on the basis of the pressure $P_0$) and DCT. If DCT is greater than DCP, the unit ECU applies to the driver circuit DC a signal with a duty-cycle equal to DCT and then calculates the duty-cycle values of DCT and DCP again, the latter, however, being calculated on the basis of the actual instantaneous value of the pressure P in the refrigeration circuit.

If, however, the duty-cycle DCT is less than DCP, the control unit ECU applies to the driver circuit DC a driving signal with the duty-cycle DCP.

The foregoing represents the general method of operation of the control unit ECU and hence of the entire system.

The operation of the entire system will now be described in detail with reference to the flow chart of FIG. 2.

In this drawing, box 10 represents the starting condition of the operation of the air-conditioning system A. This condition is detected by the unit ECU on the basis of the signal supplied to it by the sensor IC.

When the starting condition has been detected, the unit ECU initially adopts the reference value $P_0$ as the pressure of the refrigerant fluid in the circuit of the air-conditioning system (box 11 in FIG. 2).

The unit ECU then acquires the instantaneous values of the speed of forward movement V of the motor vehicle, of the rate of revolutions n of the engine of the motor vehicle, of the temperature T of the engine coolant liquid, and of the ambient temperature TA (box 12 in FIG. 2).

On the basis of the values thus acquired, the unit ECU then calculates the duty-cycle values DCT and DCP (box 13) and checks whether DCT is greater than DCP (box 14). If so, the unit ECU applies to the driver circuit DC a signal with a duty-cycle equal to DCT (box 15) and then acquires the actual instantaneous value of the pressure P of the refrigerant fluid and reacquires the instantaneous values of V, n, T (box 12) in order to calculate new values of the duty-cycles DCT and DCP (box 13).

If, however, in the initial comparison, DCT is less than DCP, the unit ECU applies to the driver circuit DC a signal with a duty-cycle equal to DCP (box 17). The speed of rotation of the motor M does not, however, adopt the value corresponding to the duty-cycle DCP instantaneously and the unit ECU monitors the speed of rotation ω of the motor (box 18). Until the instantaneous speed ω of the motor M reaches the value ω(DCP) corresponding to the duty-cycle DCP, the unit ECU repeats the steps corresponding to boxes 17, 18 and 19 of FIG. 2.

As soon as the instantaneous speed of rotation ω of the motor M becomes equal to the value ω(DCP) (box 19), the unit ECU acquires the actual instantaneous value of the pressure P of the refrigerant fluid of the air-conditioning system A (box 20). If the pressure value P thus acquired is equal to the reference value $P_0$ (box 21), the unit ECU returns to box 16 and then to box 12, repeating the various steps described up to now.

If, however, the instantaneous pressure P is other than the pressure $P_0$ (box 21), the unit ECU checks whether the instantaneous pressure is less than or greater than the pressure $P_0$ (box 22). If the pressure P is less than or greater than $P_0$, the unit ECU causes the duty-cycle of the signal applied to the driver circuit DC to vary in a manner such as to bring about a reduction or an increase in the speed of rotation ω of the motor M, respectively, (boxes 23 and 24) and then goes back to box 16 and the subsequent boxes.

The increase or reduction in the speed of rotation ω of the motor M brought about in the steps corresponding to boxes 23 and 24 of FIG. 2 may be of fixed magnitude or of a magnitude variable in accordance with a predetermined rule in dependence on the difference between the instantaneous pressure P and the reference pressure $P_0$.

The above-described method of operation of the system prevents instability in the operation of the system as a whole. In particular, it prevents the pressure P of the refrigerant fluid from adopting values outside the working range or the safety limits provided for.

Naturally, the principle of the invention remaining the same, the forms of embodiment and details of construction may be varied widely with respect to those described and illustrated purely by way of non-limiting example, without thereby departing from the scope of the invention as defined in the appended claims.

Thus, for example, in a variant, the monitoring of the speed of rotation ω of the electric motor may be omitted, by going, with reference to FIG. 2, directly from the step of box 14 to the step of box 20.

What is claimed is:

1. A control system for a direct-current electric motor of a fan which is associated, in a motor vehicle, both with a radiator of a hydraulic engine-cooling system and with a condenser of an air-conditioning system for the passenger compartment, comprising:

an analogue pressure sensor for providing a signal indicative of the pressure of the refrigerant fluid of the air-conditioning system at the output or delivery of the compressor of this system, an analogue temperature sensor for providing a signal indicative of the temperature of the liquid flowing through the engine-cooling system, in particular, upstream of the radiator, an activation sensor for providing a signal when the air-conditioning system is activated, a speed sensor (V) for providing a signal indicative of the speed of forward movement of the motor vehicle, and control and operating means connected to the sensors and to the electric motor and arranged for performing the following operations periodically:

determining a first speed of rotation for the electric motor in accordance with a predetermined function of the pressure of the refrigerant fluid of the air-conditioning system and of the speed of forward movement of the vehicle, determining a second speed of rotation for the electric motor in accordance with a predetermined function of the detected temperature of the engine-coolant liquid and of the speed of forward movement of the vehicle, and sending to the electric motor control signals to bring its speed of rotation to a value equal to the greater of the first and second speeds.

2. A system according to claim 1, in which the control and operating means are arranged to calculate, as soon as the air-conditioning system is activated, an initial value of the first speed of rotation on the basis of a predetermined reference value of the pressure and of the actually detected speed of forward movement of the motor vehicle.

3. A system according to claim 2, in which the pressure reference value is a function, in particular, an increasing function, of the ambient temperature detected by a suitable sensor and the initial value of the first speed is also a function of the ambient temperature.

4. A system according to claim 1, comprising means for detecting the rate of revolution of the engine shaft of the motor vehicle, and in that the control and operating means are arranged to determine the second speed of rotation also in dependence on the rate of revolution of the engine shaft of the motor vehicle.

5. A system according to claim 1, also comprising further detector means for providing electrical signals indicative of the speed of rotation of the electric motor, and in which, when the first speed calculated is greater than or equal to the second speed calculated, the control and operating means are arranged to monitor the speed of rotation of the electric motor and, when it reaches the first speed calculated, to compare the instantaneous pressure of the refrigerant fluid with a reference value and to bring about a reduction or an increase in the speed of rotation of the electric motor if the instantaneous pressure is less than or is greater than the reference value, respectively.

6. A system according to claim 5, in which the reduction and the increase of the speed of rotation of the electric motor, respectively, are calculated in dependence on the difference between the instantaneous pressure detected and the reference pressure value.

7. A system according to claim 1, in which the control and operating means comprise:

a driver circuit for causing the electric motor to rotate at a speed variable continuously in dependence on a square-wave driving signal with a variable duty-cycle applied to the driver circuit, and a control unit connected to the sensors, to the detector means, and to the driver circuit, the control unit being arranged to determine the values of the duty-cycle of the driving signal which correspond to the first speed of rotation and to the second speed of rotation, respectively, and to apply to the driver circuit a driving signal with the duty-cycle corresponding to the greater of the first and second speeds of rotation.

* * * * *